United States Patent
Fini

(10) Patent No.: US 9,459,402 B2
(45) Date of Patent: Oct. 4, 2016

(54) BEND COMPENSATION IN TELECOMMUNICATIONS OPTICAL FIBERS

(71) Applicant: OFS Fitel, LLC, Norcross, GA (US)

(72) Inventor: John M Fini, Metuchen, NJ (US)

(73) Assignee: OFS FITEL, LLC, Norcross, GA (US)

( * ) Notice: Subject to any disclaimer, the term of this patent is extended or adjusted under 35 U.S.C. 154(b) by 204 days.

(21) Appl. No.: 14/302,963

(22) Filed: Jun. 12, 2014

(65) Prior Publication Data

US 2015/0362670 A1    Dec. 17, 2015

(51) Int. Cl.
*G02B 6/028* (2006.01)
*G02B 6/02* (2006.01)
*G02B 6/036* (2006.01)

(52) U.S. Cl.
CPC ......... *G02B 6/0283* (2013.01); *G02B 6/02019* (2013.01); *G02B 6/0365* (2013.01)

(58) Field of Classification Search
None
See application file for complete search history.

(56) References Cited

U.S. PATENT DOCUMENTS

2009/0060437 A1*   3/2009   Fini .................... G02B 6/03688
385/127

* cited by examiner

*Primary Examiner* — Uyen Chau N Le
*Assistant Examiner* — Chad Smith
(74) *Attorney, Agent, or Firm* — Sam Han, Esq.

(57) ABSTRACT

Optical fiber profiles are shown in which the optical fiber has a large mode area, but is nevertheless sufficiently bend-insensitivity to comply with technical specifications for telecommunication optical fibers. The optical fibers meet two bend-loss conditions. First, they meet tight bend conditions, which reflects macro-bending due to coiling or bending of the optical fiber. Second, these optical fibers meet cable bend conditions, which reflect macro-bending conditions that are introduced as a result of cabling. By satisfying the tight bend-loss condition and then adjusting for the cable bend-loss condition, the optical fiber permits larger effective areas than normally achievable with only bend-compensation designs.

13 Claims, 7 Drawing Sheets

| $R_{core}$ (μm) | $R_{BCin}$ (μm) | $R_{BCin}/R_{core}$ | $R_{BCout}$ (μm) | $\Delta n_{core}$ (× 10⁻³) | $\Delta n_{BCin}$ (× 10⁻³) | $\Delta n_{BCout}$ (× 10⁻³) | $\Delta n_{out}$ (× 10⁻³) | $A_{eff}$ (μm²) | Loss $LP_{01}$ (×10⁻⁵ dB/m) | Loss HOM (dB/m) | $\Delta n_{eff\,01,11}$ (× 10⁻³) | $A_{eff\,(no\,bend)}$ (μm²) | BC ratio |
|---|---|---|---|---|---|---|---|---|---|---|---|---|---|
| 9.00 | 24.83 | 2.76 | 50.66 | 3.83 | 0 | -1.95 | 0 | 198.96 | 1.0 | 36.73 | 1.33 | 208.56 | 1.02 |
| 10.00 | 28.71 | 2.87 | 53.85 | 3.78 | 0 | -1.95 | 0 | 224.92 | 1.0 | 11.74 | 1.16 | 243.52 | 1.00 |
| 11.00 | 31.58 | 2.87 | 56.77 | 3.75 | 0 | -1.95 | 0 | 249.22 | 1.0 | 3.73 | 1.02 | 281.68 | 1.00 |
| 12.00 | 35.11 | 2.93 | 59.31 | 3.77 | 0 | -1.95 | 0 | 270.46 | 1.0 | 1.51 | 0.915 | 322.14 | 0.96 |

FIG. 2B

| $R_{core}$ (μm) | $R_{BCin}$ (μm) | $R_{BCin}/R_{core}$ | $R_{BCout}$ (μm) | $\Delta n_{core}$ (× 10⁻³) | $\Delta n_{BCin}$ (× 10⁻³) | $\Delta n_{BCout}$ (× 10⁻³) | $\Delta n_{out}$ (× 10⁻³) | $A_{eff}$ (μm²) | Loss $LP_{01}$ (×10⁻⁵ dB/m) | Loss HOM (dB/m) | $\Delta n_{eff\,01,11}$ (× 10⁻³) | $A_{eff\,(no\,bend)}$ (μm²) | BC ratio | μ-bend (arbitrary units) |
|---|---|---|---|---|---|---|---|---|---|---|---|---|---|---|
| 9.0 | 26.7 | 2.97 | 50.0 | 4.35 | 0 | -2.34 | 0 | 189 | 0.645 | 29.5 | 1.40 | 201 | 0.92 | 393 |
| 10.5 | 31.3 | 2.98 | 56.0 | 4.35 | 0 | -2.34 | 0 | 223 | 0.285 | 2.0 | 1.14 | 253 | 0.98 | 2442 |
| 12.0 | 33.9 | 2.82 | 58.4 | 4.19 | 0 | -2.34 | 0 | 253 | 0.945 | 1.1 | 0.95 | 315 | 0.97 | 12582 |

FIG. 2C

| $R_{core}$ (μm) | $R_{BCin}$ (μm) | $R_{BCin}/R_{core}$ | $R_{BCout}$ (μm) | $\Delta n_{core}$ (× 10⁻³) | $\Delta n_{BCin}$ (× 10⁻³) | $\Delta n_{BCout}$ (× 10⁻³) | $\Delta n_{out}$ (× 10⁻³) | Loss $LP_{01}$ (×10⁻⁹ dB/m) | Loss HOM (dB/m) | $\Delta n_{eff\,01,11}$ (× 10⁻³) | $A_{eff\,(no\,bend)}$ (μm²) | BC ratio | μ-bend (arbitrary units) |
|---|---|---|---|---|---|---|---|---|---|---|---|---|---|
| 7.0 | 29.72 | 4.25 | 62.5 | 6.48 | 0 | -3.53 | 0 | 9.28 | 6.43 | 2.21 | 125.30 | 1.20 | 11.06 |
| 7.5 | 29.93 | 3.99 | 62.5 | 6.36 | 0 | -4.31 | 0 | 0.509 | 4.43 | 2.01 | 139.05 | 0.97 | 22.23 |
| 8.0 | 29.65 | 3.71 | 62.5 | 6.35 | 0 | -4.41 | 0 | 0.229 | 3.34 | 1.84 | 152.98 | 0.96 | 46.47 |

FIG. 2D

| $R_{core}$ (μm) | $R_{ped}$ (μm) | $R_{ped}/R_{core}$ | $R_{BCout}$ (μm) | $\Delta n_{core}$ (× 10⁻³) | $\Delta n_{trench}$ (× 10⁻³) | $\Delta n_{out}$ (× 10⁻³) | $A_{eff}$ (μm²) | Loss $LP_{01}$ (×10⁻⁵ dB/m) | Loss tight (dB)/m | Loss HOM (dB/m) | $\Delta n_{eff\,01,11}$ (× 10⁻³) |
|---|---|---|---|---|---|---|---|---|---|---|---|
| 9.0 | 36.0 | 4.00 | 50.0 | 4.3 | -1.03 | 0 | 193 | 1.0 | 1.00 | 0.99 | 1.38 |
| 10.0 | 40.0 | 4.00 | 54.0 | 3.9 | -1.74 | 0 | 223 | 1.0 | 0.86 | 4.45 | 1.17 |
| 11.0 | 44.0 | 4.00 | 58.0 | 4.0 | -1.29 | 0 | 246 | 1.0 | 0.77 | 2.96 | 1.11 |
| 9.0 | 34.3 | 3.81 | 54.3 | 4.1 | -0.992 | 0 | 195 | 1.0 | 1.00 | 3.44 | 1.37 |
| 10.0 | 40.0 | 4.00 | 60.0 | 4.0 | -1.43 | 0 | 222 | 0.31 | 1.00 | 11.43 | 1.18 |
| 11.0 | 42.9 | 3.90 | 62.9 | 3.9 | -1.56 | 0 | 248 | 0.41 | 0.92 | 8.00 | 1.10 |
| 9.0 | 36.2 | 4.02 | 67.2 | 4.0 | -1.20 | 0 | 196 | 1.0 | 4.87 | 33.50 | 1.36 |
| 10.0 | 39.8 | 3.98 | 67.3 | 4.0 | -1.20 | 0 | 222 | 1.0 | 1.34 | 9.33 | 1.18 |
| 11.0 | 43.2 | 3.93 | 67.2 | 4.0 | -1.20 | 0 | 246 | 1.0 | 0.82 | 1.94 | 1.04 |
| 12.0 | 45.4 | 3.79 | 65.9 | 3.9 | -1.20 | 0 | 268 | 1.0 | 0.81 | 0.53 | 0.924 |
| 13.0 | 48.1 | 3.70 | 65.1 | 4.0 | -1.20 | 0 | 287 | 1.0 | 0.62 | 0.30 | 0.834 |
| 9.0 | 35.5 | 3.95 | 66.5 | 3.9 | -1.33 | 0 | 198 | 1.0 | 9.98 | 84.32 | 1.37 |
| 10.0 | 39.1 | 3.91 | 66.6 | 3.9 | -1.34 | 0 | 224 | 1.0 | 2.18 | 23.47 | 1.21 |
| 11.0 | 41.6 | 3.78 | 65.6 | 3.8 | -1.45 | 0 | 249 | 1.0 | 2.03 | 8.60 | 1.09 |
| 12.0 | 45.2 | 3.77 | 65.7 | 3.8 | -1.62 | 0 | 270 | 0.56 | 1.49 | 3.64 | 1.00 |
| 13.0 | 47.8 | 3.68 | 64.8 | 3.9 | -1.43 | 0 | 288 | 1.0 | 0.96 | 1.48 | 0.941 |
| 14.0 | 51.1 | 3.65 | 64.6 | 4.0 | -1.38 | 0 | 303 | 1.0 | 0.79 | 0.32 | 0.896 |

FIG. 4B

BEND COMPENSATION IN TELECOMMUNICATIONS OPTICAL FIBERS

CROSS-REFERENCE TO RELATED APPLICATIONS

This application incorporates by reference the following patent applications as if expressly set forth herein in their entireties: (a) U.S. Patent Publication Number US2013/0251324, filed on 2011 Dec. 5, by Fini et al., having the title "Large Mode Area Optical Fibers with Bend Compensation"; (b) U.S. provisional patent application No. 61/506,631, filed on 2011 Jul. 11; and (c) U.S. provisional patent application No. 61/419,420, filed on 2010 Dec. 3. Consequently, this application adopts the terms and phrases that are used in the above-referenced applications (collectively, "Fini Applications").

BACKGROUND

1. Field of the Disclosure

The present disclosure relates generally to optical fibers and, more particularly, to telecommunications optical fibers.

2. Description of Related Art

Optical fibers that are used in long-haul telecommunications sometimes suffer from nonlinear effects. Some of those nonlinear effects can be mitigated by increasing the mode area of the optical fiber. Unfortunately, an increase in mode area results in greater susceptibility to bend losses. Consequently, it is difficult to increase mode area in an optical fiber while concurrently mitigating for bend loss.

SUMMARY

The present disclosure provides systems and methods for mitigating bend effects in transmission optical fibers. Briefly described, for some embodiments, the transmission optical fiber meets two bend-loss conditions, namely, a tight macro-bend loss condition (or, simply, tight bend condition) and a cabling macro-bend loss condition (or, simply, cable bend condition). By strategically manipulating the cable bend condition, in addition to the tight bend condition, greater bend compensation can be achieved while maintaining larger mode areas.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 2B, 2C, and 2D are tables showing example values for the optical fiber profile of FIG. 2A.

FIG. 4B is a table showing example values for the optical fiber profile of FIG. 4A.

DETAILED DESCRIPTION OF THE EMBODIMENTS

Figure 1:
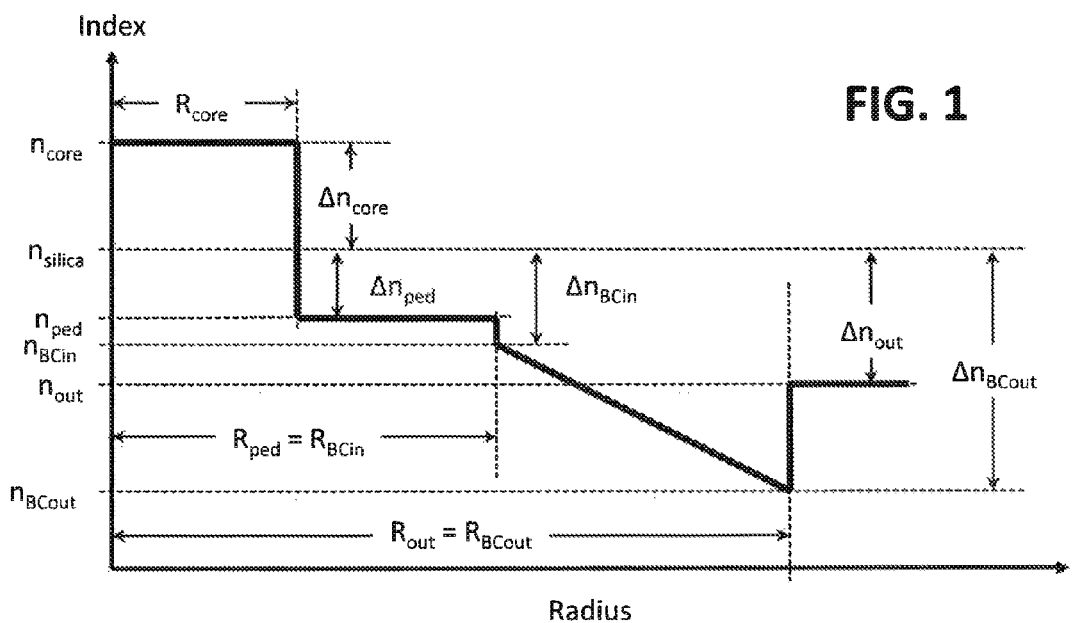
FIG. 1 is a diagram showing one embodiment of an optical fiber profile that compensates for bend losses.

Bending of optical fibers affects signals that propagate through the optical fibers. Previous works have explored bend compensation for optical fibers that have known curvatures, such as for optical fibers that are used in fiber amplifier applications. For those types of applications, a large portion of the optical fiber is typically coiled to a fairly well-defined bend radius. Consequently, a manufacturer can compensate for that known bend at the time of fiber fabrication. Thus, when the optical fiber is eventually coiled, the bend in the fiber has already been taken into consideration to mitigate the effects of the bend.

The issue of bend compensation becomes much more difficult when there is no a priori knowledge of the eventual bend, such as, for example, for telecommunication fibers. In typical long-haul telecommunication fibers that reside within a cable, a vast majority of the fiber is straight. Unlike fiber amplifiers, telecommunications cables will in practice see a wide variety of bend conditions and arrangements, and fibers in these cables must meet system requirements without imposing onerous restrictions on cable layout. Further, the fiber must simultaneously satisfy a single-modedness condition in the relatively straight cabled segments and a bend-insensitivity requirement that allows for occasional bends that are much tighter. The large difference in these bend conditions makes the tradeoff between bend loss, single-modedness, and mode area stricter. As a tighter bend radius is specified in the bend insensitivity requirement, one must use a fiber with stronger confinement and generally higher index contrast. But conventionally the single-modedness is specified for a nearly straight fiber, so the fiber does not see much bend-induced suppression of higher order modes. Such suppression tends to improve single-modedness for coiled fiber arrangements. In order to achieve single-modedness in a nearly-straight condition, the fiber must generally have a lower index contrast than it would need to achieve single-modedness in a coiled or bent condition. Thus for conventional approaches, the two very different bend conditions exacerbate the conflicting requirements of bend insensitivity (requiring high contrast, especially for very tight bends) and single-modedness (requiring low contrast, especially when straight). Because a wide range of bend characteristics are seen for telecommunication optical fibers, designing those optical fibers for greater bend-insensitivity results in a correspondingly smaller mode area, and vice versa. Thus, for telecommunication optical fibers, where there is no single well-defined bend condition relevant to both bend insensitivity and single-modedness, there is no straight-forward way to pre-compensate the bend perturbation or apply previously discussed bend-compensation strategies. More specifically, as a result of the mode-area-to-bend-insensitivity tradeoff, it is difficult to construct optical fibers that have an effective area that is greater than 150 square micrometers (μm²) while concurrently meeting other requirements.

The various embodiments disclosed herein overcome this difficulty by, first, managing fiber bends so that single-modedness need not be achieved in a straight arrangement, and, second, applying a bend-compensated strategy, where the perturbation induced by the managed "cable" bend is pre-compensated. Bend management can be achieved through known cabling techniques (e.g., by controlling the approximately-helical shape of the fiber within the cable), and can greatly relax the single-modedness requirement (allowing the higher index contrast). The bend-compensated fiber index profile allows one to achieve greater bend insensitivity.

We thus provide for optical fibers that have a large mode area, yet have sufficient bend-insensitivity to comply with technical specifications for telecommunication optical fibers. For some embodiments, the optical fiber meets two bend-loss conditions, namely, a tight macro-bend loss condition (or, simply, tight bend condition) and a cabling macro-bend loss condition (or, simply, cable bend condition). For those embodiments, the optical fiber comprises an effective area that is less than approximately 300 μm² with a tight bend condition of approximately one (1) decibel (dB) per meter (m) at a tight-bend diameter ($D_{bend,t}$) of approximately twenty (20) millimeters (mm) and a cable bend condition of approximately $10^{-5}$ dB/m at a cable bend diameter ($D_{bend,c}$), where $D_{bend,c}$ is defined to be two (2) times the radius of curvature of the bend of the optical fiber as it is arranged in the cable.

Having generally described a large-mode-area (LMA) fiber that satisfies both tight bend-loss conditions and cable bend-loss conditions, reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents. Furthermore, to the extent that some of the foundational information is described in detail in the Fini Applications, one having ordinary skill in the art is presumed to have knowledge of that foundational information.

With this in mind, attention is turned to FIG. 1, which is a diagram showing one embodiment of an optical fiber profile that compensates for bend losses. Before discussing specific dimensional parameters that mitigate for bend loss, it is helpful to note the general characteristics of the optical fiber profile that, when properly designed, permit suitably large mode areas while concurrently mitigating for bend loss.

As shown in FIG. 1, the optical fiber profile comprises a core that has a core index ($n_{core}$) and extends to a core radius ($R_{core}$). For the embodiments described herein, index values are provided relative to pure silica at 633 nanometers (nm), which is the wavelength often used for measuring index profiles. Thus, for example, $n_{core}=n_{silica}+\Delta n_{core}$; $n_{BCin}=n_{silica}+\Delta n_{BCin}$; etc.

Continuing with FIG. 1, radially exterior to the core is a pedestal region that has a pedestal index ($n_{ped}$) and extends to a pedestal radius ($R_{ped}$). Radially exterior to the pedestal region is a bend compensation (BC) region, which extends from an inner radius ($R_{BCin}$) to an outer radius ($R_{BCout}$). As explained in the Fini Applications, the BC region is graded or stepped such that the index at $R_{BCin}$ ($n_{BCin}$) is greater than the index at $R_{BCout}$ ($n_{BCout}$). In order to properly compensate for a bend radius ($R_{bend}$), such that:

$$-(n_{BCout}-n_{BCin})/(R_{BCout}-R_{BCin})\approx 0.8(n_{silica}/R_{bend}) \qquad [\text{Eq. 1}].$$

For the particular embodiment of FIG. 1, $n_{ped} \ne n_{BCin}$. However, it should be appreciated that other embodiments, such as the embodiment of FIG. 2A, contemplate $n_{ped}$ being approximately equal (or even exactly equal) to $n_{BCin}$ (and thus $\Delta n_{ped} \approx \Delta n_{BCin}$), thereby substantially eliminating the step between the pedestal region and the BC region that currently exists in FIG. 1.

Figure 2A:
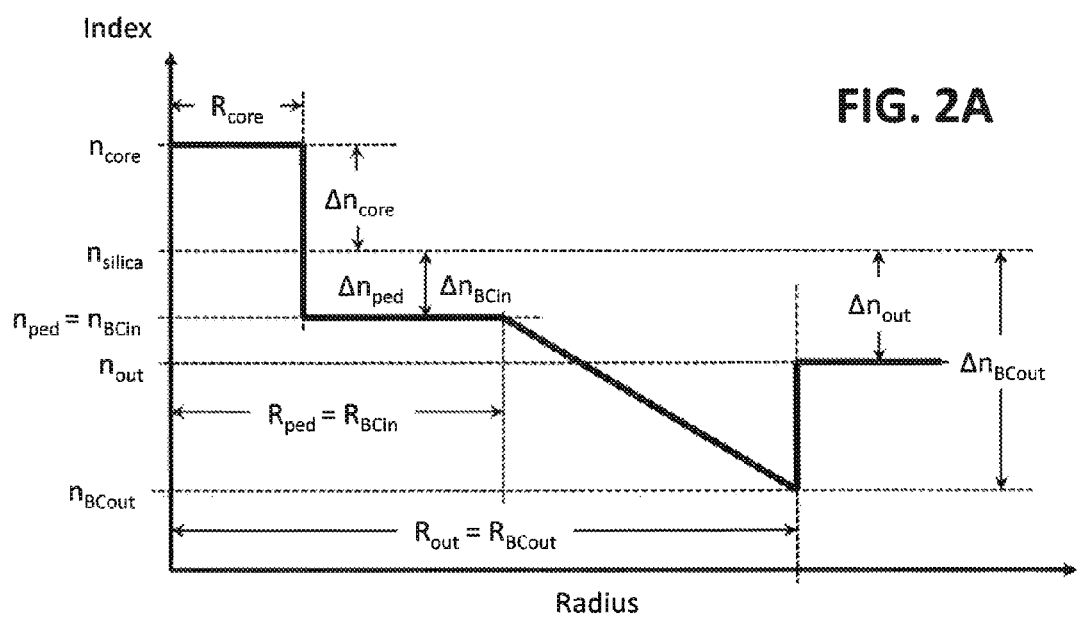
FIG. 2A is a diagram showing another embodiment of an optical fiber profile that compensates for bend losses, with the optical fiber having a $\Delta n_{ped}$ is approximately equal to $\Delta n_{BCin}$ ($\Delta n_{ped} \approx \Delta n_{Bin}$).
Figure 3:
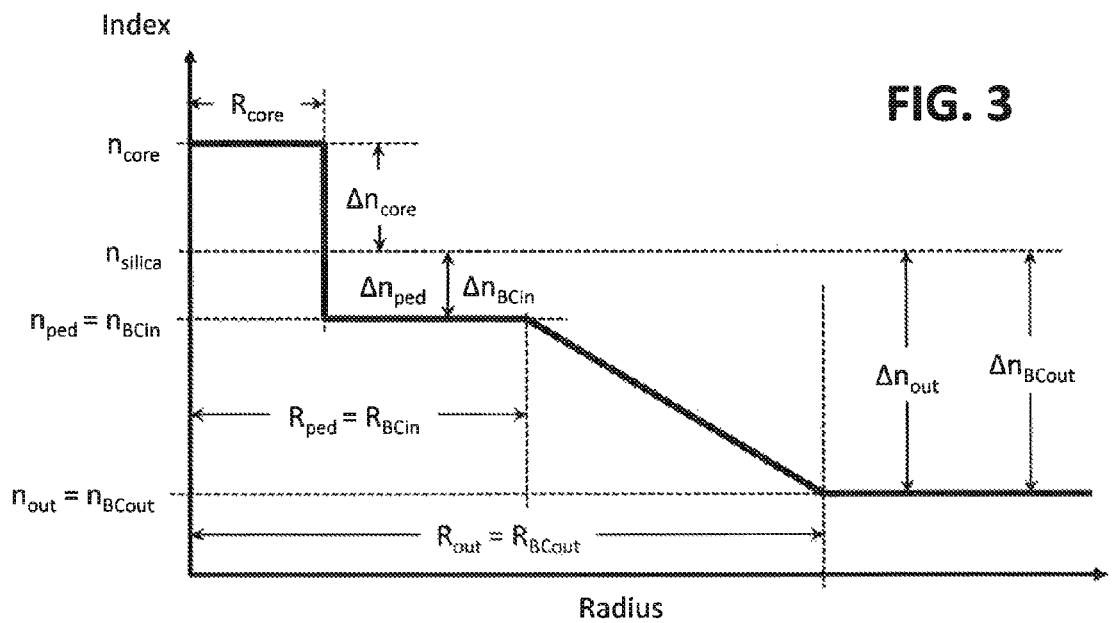
FIG. 3 is a diagram showing another embodiment of an optical fiber profile that compensates for bend losses, where $\Delta n_{ped} \approx \Delta n_{BCin}$ and $\Delta n_{out} \approx \Delta n_{BCout}$.

Next, radially exterior to the BC region resides an outer cladding that is located at an outer cladding radius ($R_{out}$), with the outer cladding having an outer cladding index ($n_{out}$). Similar to how the embodiment of FIG. 2A shows $n_{ped} \approx n_{BCin}$ and, consequently, $\Delta n_{ped} \approx \Delta n_{BCin}$, it should be appreciated that $n_{BCout} \approx n_{out}$ and consequently $\Delta n_{BCout} \approx \Delta n_{out}$, thereby substantially eliminating the step between the BC region and the outer cladding. FIG. 3 is a diagram showing the embodiment of the optical fiber profile, where $\Delta n_{ped} \approx \Delta n_{BCin}$ and $\Delta n_{out} \approx \Delta n_{BCout}$.

Using these dimensional values (R) and relative index values ($\Delta n$), it should be noted that a mode area of an optical fiber is primarily determined by its core radius $R_{core}$. In other words, a larger $R_{core}$ translates into a larger mode area. Next, in order to achieve large, selective suppression of higher-order modes (HOM), the BC region (ranging from $R_{BCin}$ to $R_{BCout}$) should be sufficiently large. Also, it is desirable to have the difference between $n_{core}$ and $n_{out}$ ($n_{core}-n_{out}$) be large enough to satisfy fabrication constraints, such as, for example, the outer cladding being made of low-cost materials while the core has sufficient dopant concentration to reduce the impact of manufacturing variability, or sufficient Ytterbium (Yb) and aluminum (Al) to achieve high gain and low photo-darkening. For some embodiments, these constraints translate to ($n_{core}-n_{out}$) being greater than approximately $10^{-3}$. Additionally, since $R_{BCin}$ has an impact on both HOM suppression and fundamental-mode bend-loss, it is preferable to maintain a proper ratio of $R_{BCin}$ to $R_{core}$ ($R_{BCin}/R_{core}$).

With these general characteristics and constraints of the optical fiber profile in mind, attention is turned to FIGS. 2B, 2C, and 2D, which are tables showing specific dimensional values (R) and relative index values ($\Delta n$) for the optical fiber profile of FIG. 2A. Further shown in FIGS. 2B, 2C, and 2D are the effective areas and losses that correspond to the R and $\Delta n$.

Specifically, FIG. 2B shows optical fiber profiles having $R_{core}$ between approximately 9 μm and 12 μm, $R_{BCin}$ between approximately 24 μm and 36 μm, which translates into a $R_{BCin}/R_{core}$ that ranges between approximately 2.5 and 3. For the embodiments of FIG. 2B, the cable bend had an equivalent bend diameter of 30 mm, and the tight-bend is a macro-bending loss that is less than 10 dB/m at $D_{bend,t}$ of 20 mm at a wavelength of 1550 nm. Also, the $n_{core}-n_{ped}$ preferably ranges between approximately $3.5 \times 10^{-3}$ and $4 \times 10^{-3}$. These R and $\Delta n$ values shown in FIG. 2B allow for sufficient HOM suppression while not adversely affecting transmission loss characteristics for the fundamental mode. Additionally, the values in FIG. 2B show that the effective area ($A_{eff}$, comparing $A_{eff}$ with $A_{eff\ (no\ bend)}$) is relatively unaffected when the cable bend ($D_{bend,c}$) is approximately 25 mm to 30 mm and the tight bend ($D_{bend,t}$) is approximately 20 mm. The bend compensation ratio is approximately one (1), where this ratio is defined as BC ratio=$0.8 n_{silica}(R_{BCout}-R_{BCin})/[(D_{bend,c}/2)*(D_{NBCin}-D N_{BCout})]$ FIG. 2C shows values for index profiles where resistance to very tight bends may be desirable. Specifically, FIG. 2C shows target values for a cable bend with an equivalent bend diameter of 25 mm, where the tight-bend is a macro-bending loss that is less than 10 dB/m at $D_{bend,t}$ of 15 mm at a wavelength of 1550 nm. This implies a loss of approximately 0.5 dB for a single turn. As shown in FIG. 2C, the BC ratio is approximately 1, with $R_{BCin}/R_{core}$ being approximately 3. Calculated micro-bend sensitivity shows that it increases (in arbitrary units) as a function of increasing $A_{eff}$. It should also be noted that fibers that are suitable for tighter bends will generally have a larger $n_{core}-n_{BCin}$ and a larger gradient (in proportion to $1/R_{bend,t}$, so that the bend compensation ration stays at approximately 1.

FIG. 2D shows values for the case $D_{bend,c}=18$ mm and $D_{bend,t}=10$ mm. These optical fiber profiles having large $A_{eff}$ (between approximately 120 μm² and 160 μm²), large HOM loss and negligible tunneling loss at a $D_{bend,c}$ that is less than approximately 18 mm, and a 3 dB/m loss at $D_{bend,t}$ of approximately 10 mm. As shown in FIG. 2D, the fiber profiles have BC ratios that range between approximately 0.9 and 1.2, maintain moderate micro-bending sensitivity, and an outer diameter of approximately 125 μm (twice the value of $R_{BCout}$).

Figure 4A:
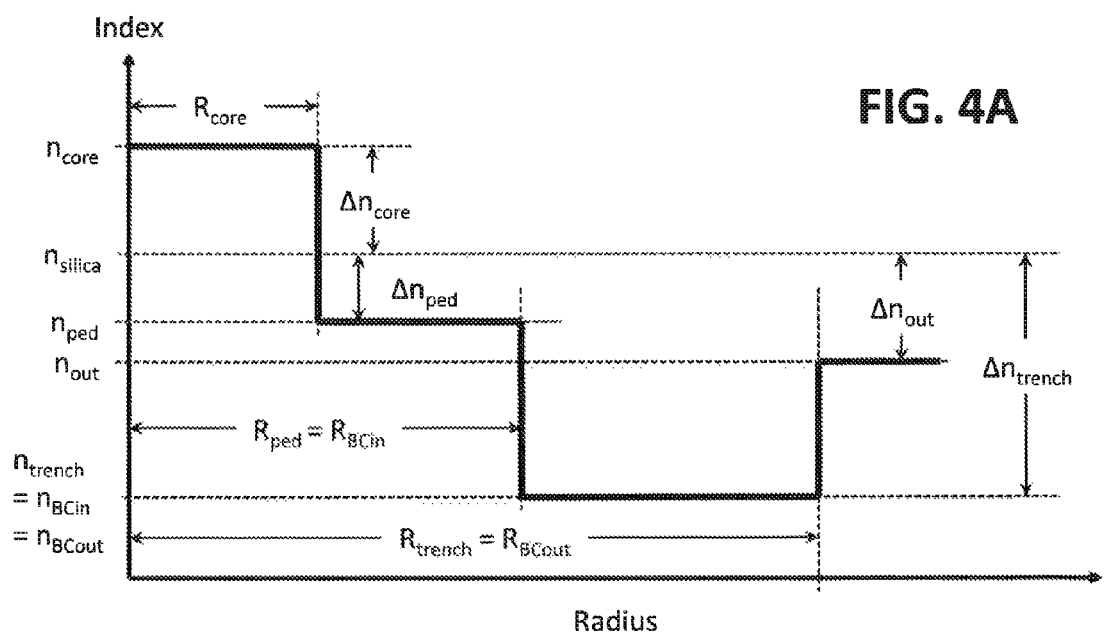
FIG. 4A is a diagram showing another embodiment of an optical fiber profile that compensates for bend losses, where $\Delta n_{BCin} \approx \Delta n_{BCout} \approx \Delta n_{trench}$.

FIG. 4A is a diagram showing another embodiment of an optical fiber profile that compensates for bend losses, where $\Delta n_{BCin} \approx \Delta n_{BCout} \approx \Delta n_{trench}$, and FIG. 4B is a table showing example values for the optical fiber profile of FIG. 4A, for the case $D_{bend,c}=30$ mm and $D_{bend,t}=20$ mm. Specifically, the difference between FIG. 2A and FIG. 4A is that the gradient in the BC region is flat for FIG. 4A while it is graded for FIG. 2A. Consequently, FIG. 4A shows a single-step BC region. With this in mind, as can be seen from FIG. 4B, $R_{ped}/R_{core}$ ranges between approximately 3.5 and 4, $n_{core}-n_{ped}$ ranges between approximately $3.5\times10^{-3}$ and $4.5\times10^{-3}$, and $n_{trench}-n_{ped}$ ranges between approximately $-2\times10^{-3}$ and $-1\times10^{-3}$.

At its outer boundaries, the various embodiments show optical fibers having $A_{eff}$ less than approximately 350 μm², a tight bend loss less than approximately 5 dB/m at a minimum $D_{bend,t}$ less than approximately 20 mm, and a cable bend loss less than approximately $10^{-5}$ dB/m at a minimum $D_{bend,c}$ less than approximately 50 mm. A general index profile of such fibers include a core (with $n_{core}$ and $R_{core}$), a pedestal region surrounding the core (with $n_{ped}<n_{core}$), which has a radius ($R_{BCin}$) such that $R_{BCin}/R_{core}$ is between approximately 2.5 and 4.5. Radially surrounding the pedestal region is a bend compensation (BC) region (extending from $R_{BCin}$ to $R_{BCout}$, and having an indices of refraction $n_{BCin}<n_{core}$ and $n_{BCout}<n_{core}$). For some embodiments, $n_{BCin}<n_{ped}$, and $n_{BCout}<n_{BCin}$.

Preferably, for some embodiments, $R_{core}$ ranges from approximately 7 μm to 14 μm, with $A_{eff}$ being between approximately 110 μm² and 300 μm². For those embodiments, $R_{BCin}$ ranges from approximately 24 μm to 52 μm, and $R_{BCout}$ ranges from approximately 50 μm to 70 μm. $D_{bend,t}$ are as small as approximately 10 mm for some embodiments, and $D_{bend,c}$ for some embodiments are less than approximately 35 mm. It should be appreciated that the particular dimensions can vary based on design criteria, as long as both tight bend and cable bend conditions are met.

Figure 5A:
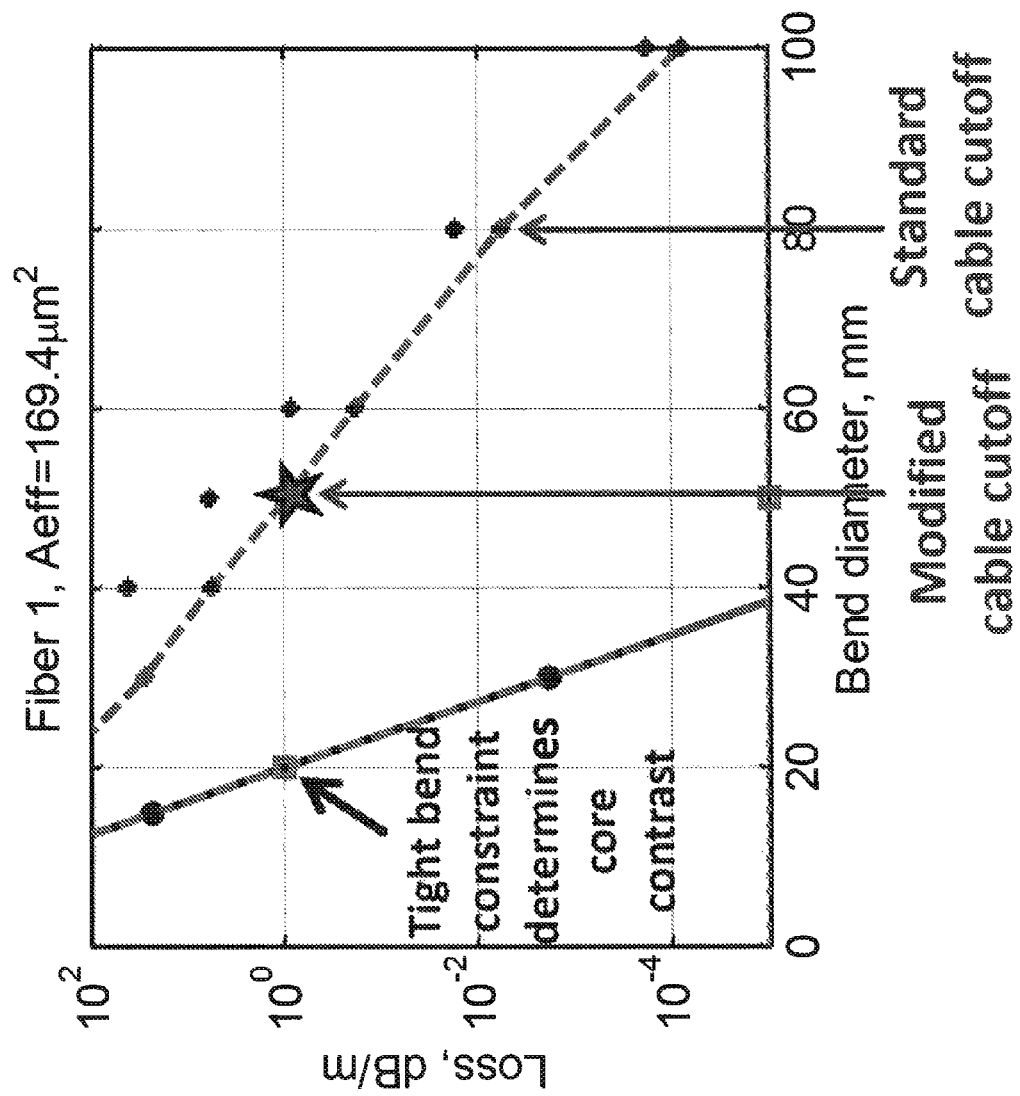
FIGS. 5A, 5B, and 5C are charts showing loss (in dB/m) as a function of bend diameter (in mm).
Figure 5B:
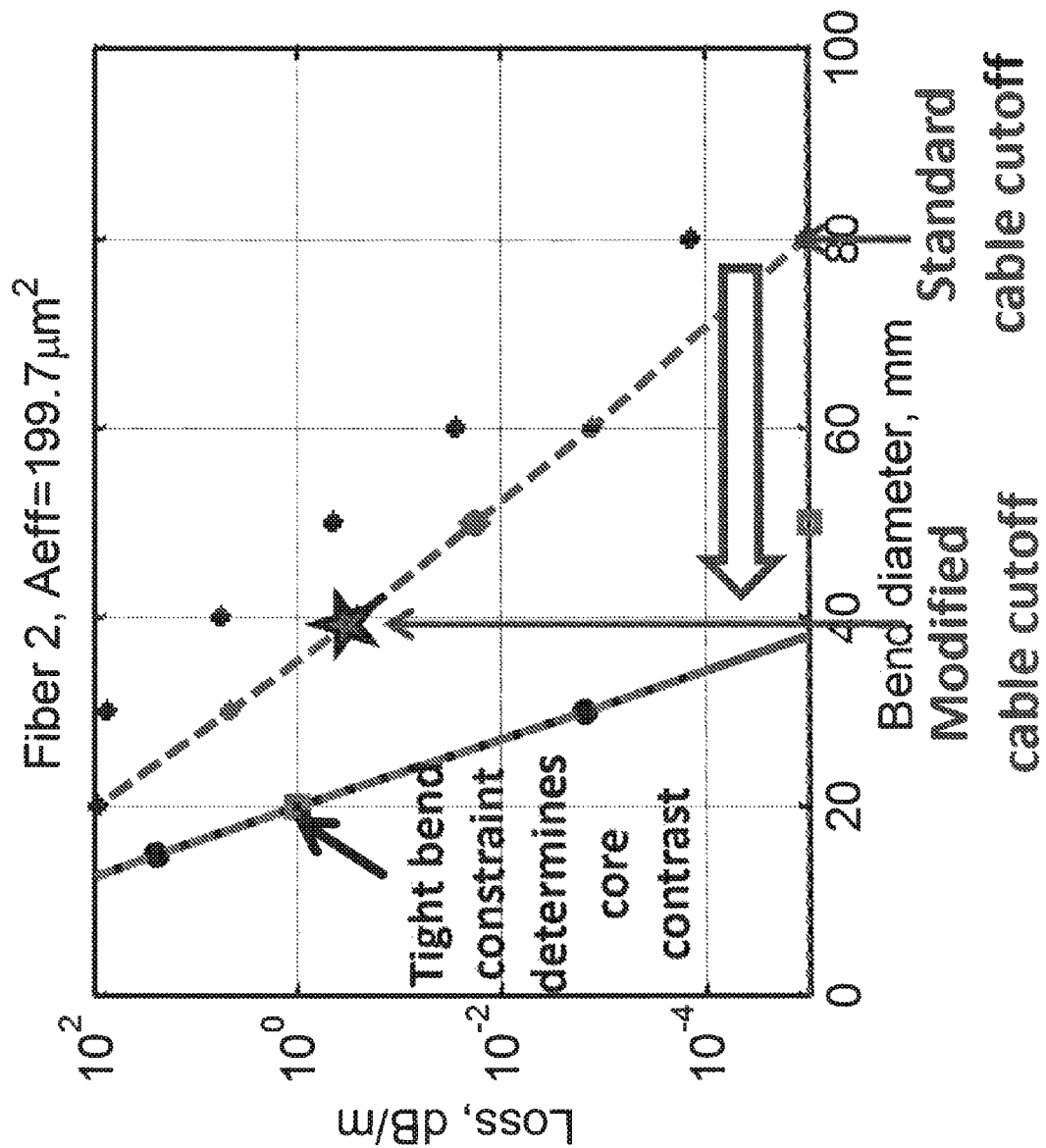
Figure 5C:
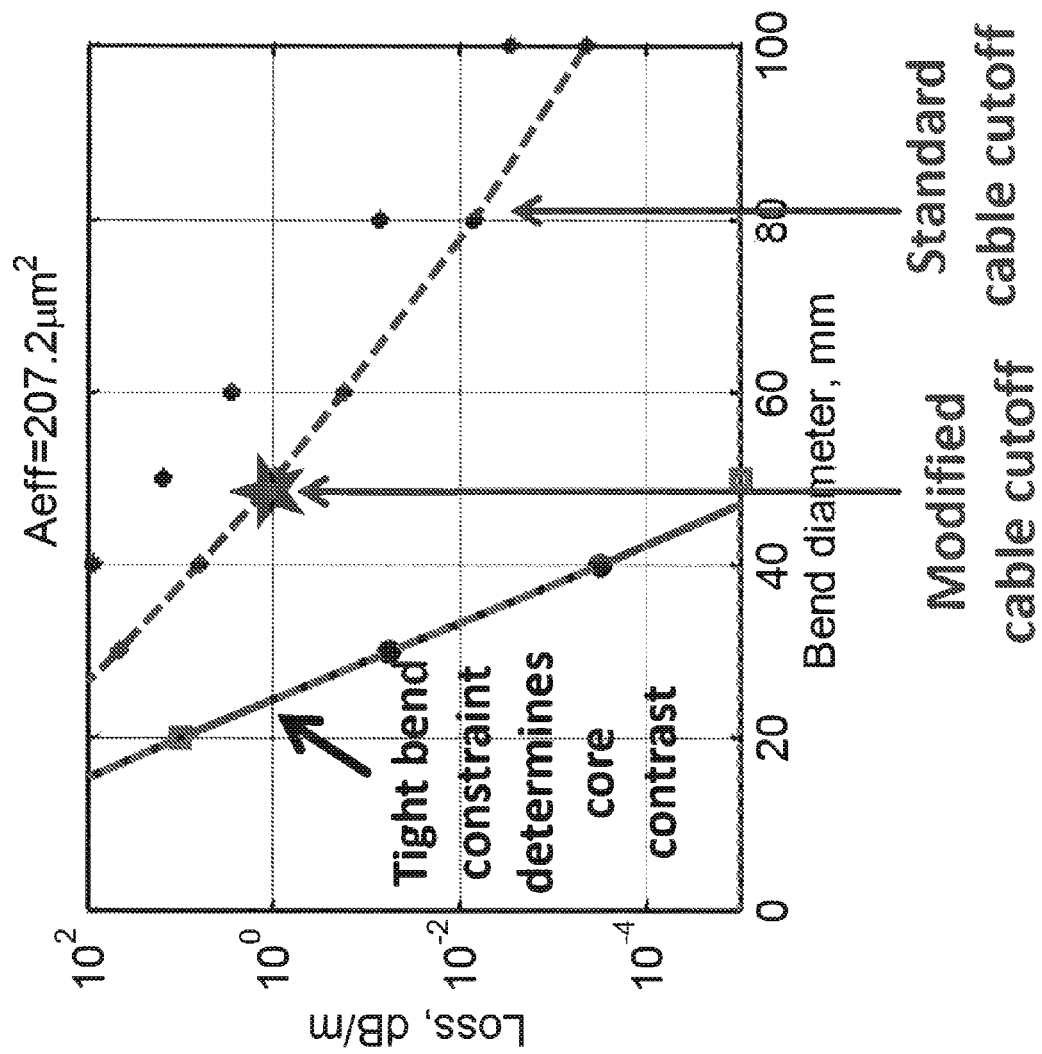

FIGS. 5A, 5B, and 5C (collectively, FIG. 5) are charts showing loss (in dB/m) as a function of bend diameter (in mm). Specifically, the solid line shows fundamental-mode loss as a function of bend diameter. Typically, bend-loss specifications for fiber-optic cables address the fundamental-mode loss (solid line). The broken line shows higher-order mode (HOM) loss as a function of bend diameter. This HOM loss determines the single-modedness of the fiber.

By way of example, FIG. 5A shows the bend-loss plot for an optical fiber having an effective area ($A_{eff}$) of approximately 170 μm; FIG. 5B shows the bend-loss plot for $A_{eff} \approx 200$ μm; and FIG. 5C shows the bend-loss plot for $A_{eff} \approx 207$ μm. As shown in FIG. 5A, at a standard cable cutoff of $D_{bend}=80$ mm, the HOM loss is very small and, thus, the optical fiber does not exhibit the desired single-modedness at this bend diameter. However, if a modified cable configuration is adopted and a non-standard cable cutoff of $D_{bend}=50$ mm is used, then the HOM loss would be much greater (as shown by the star on the broken line), thereby increasing the single-modedness of the fiber. Similarly, FIGS. 5B and 5C provide examples of how a non-standard cable cutoff permits relaxation of the single-modedness condition, thereby permitting the design of optical fibers that balance the tradeoff between mode area, bend loss, and single-modedness for different bend conditions. Consequently, the optical fiber has a HOM loss at $D_{bend,c}$ such that the optical fiber exhibits single-moded behavior at $D_{bend,c}$.

As shown from the various embodiments disclosed in FIGS. 1 through 5C, optical fiber profiles are shown in which the optical fiber has a large mode area, but is nevertheless sufficiently bend-insensitivity to comply with technical specifications for telecommunication optical fibers. The optical fibers meet two bend-loss conditions. First, they meet tight bend conditions, which reflects macro-bending due to coiling or bending of the optical fiber. Second, these optical fibers meet cable bend conditions, which reflect macro-bending conditions that are introduced as a result of cabling. By satisfying the tight bend-loss condition and then adjusting for the cable bend-loss condition, the optical fiber permits larger effective areas than normally achievable with conventional designs. Unlike previous bend-compensated designs, the designs disclosed here show how bend compensation can be applied to satisfy simultaneous tight-bend and cable-bend requirements.

Any process descriptions or blocks in flow charts should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure. Although exemplary embodiments have been shown and described, it will be clear to those of ordinary skill in the art that a number of changes, modifications, or alterations to the disclosure as described may be made. For example, it should be appreciated that, although specific numerical values are provided with reference to FIGS. 2B, 2C, 2D, and 4B, those values can be adjusted to achieve similar bend-compensation and HOM suppression characteristics as the fiber profiles disclosed herein. All such changes, modifications, and alterations should therefore be seen as within the scope of the disclosure.

What is claimed is:
1. An optical fiber, comprising:
an effective mode area ($A_{eff}$) that is less than approximately three hundred and fifty square micrometers (350 μm²);

a tight bend loss that is less than approximately five decibel per meter (5 dB/m) at a minimum tight-bend diameter ($D_{bend,t}$), the $D_{bend,t}$ being less than approximately twenty millimeters (20 mm);

a cable bend loss that is less than approximately $10^{-5}$ dB/m at a minimum cable bend diameter ($D_{bend,c}$), the $D_{bend,c}$ being less than approximately 50 mm, the optical fiber exhibiting single-moded behavior at the $D_{bend,c}$.

2. The optical fiber of claim 1, further comprising an index profile, the index profile comprising:

a core having a core index of refraction ($n_{core}$), the core further having a core radius ($R_{core}$), a pedestal region surrounding the core, the pedestal region having a pedestal index of refraction ($n_{ped}$) that is less than $n_{core}$, the pedestal region extending to a pedestal radius ($R_{BCin}$) such that a ratio $R_{BCin}/R_{core}$ is between approximately 2.5 and 4.5; and a bend compensation (BC) region surrounding the pedestal region, the BC region extending between $R_{BCin}$ and an outer radius ($R_{BCout}$), the BC region having an inner index of refraction ($n_{BCin}$) at $R_{BCin}$, $n_{BCin}$ being less than $n_{core}$, the BC region having an outer index of refraction ($n_{BCout}$) at $R_{BCout}$.

3. The optical fiber of claim 2, $R_{BCin}/R_{core}$ being approximately 3.

4. The optical fiber of claim 2, $n_{BCin}$ being less than $n_{ped}$.

5. The optical fiber of claim 2, $n_{BCout}$ being less than $n_{BCin}$.

6. The optical fiber of claim 2, $n_{BCout}$ being substantially equal to $n_{BCin}$.

7. The optical fiber of claim 2, $R_{core}$ being between approximately 7 μm and 14 μm.

8. The optical fiber of claim 2, $R_{BCin}$ being between approximately 24 μm and 52 μm.

9. The optical fiber of claim 2, $R_{BCout}$ being between approximately 50 μm and 70 μm.

10. The optical fiber of claim 1, $A_{eff}$ being less than approximately 300 μm².

11. The optical fiber of claim 10, $A_{eff}$ being between approximately 110 μm² and 300 μm².

12. The optical fiber of claim 1, $D_{bend,t}$ being less than approximately 10 mm.

13. The optical fiber of claim 1, $D_{bend,c}$ being less than approximately 40 mm.

* * * * *